United States Patent

Wannan

[11] 3,888,276
[45] June 10, 1975

[54] WATER CUT-OFF MEANS
[75] Inventor: Ian Richard Wannan, Eden Hills, Australia
[73] Assignee: Wannan Industries Pty. Ltd., Australia
[22] Filed: Nov. 29, 1973
[21] Appl. No.: 420,258

[52] U.S. Cl. ............... 137/402; 137/404; 251/65; 239/65
[51] Int. Cl. ........................................ F16k 31/44
[58] Field of Search ............ 137/78, 386, 400, 402, 137/403, 404, 416; 251/65, 74; 239/65

[56] References Cited
UNITED STATES PATENTS

| | | | |
|---|---|---|---|
| 2,577,337 | 12/1951 | Lancaster | 137/78 X |
| 2,895,493 | 7/1959 | Edwards | 137/78 |
| 2,965,117 | 12/1960 | Gallacher | 137/78 |

FOREIGN PATENTS OR APPLICATIONS

| | | | |
|---|---|---|---|
| 733,788 | 5/1966 | Canada | 137/402 |

Primary Examiner—Martin P. Schwadron
Assistant Examiner—David R. Matthews
Attorney, Agent, or Firm—Jay L. Chaskin, Esq.

[57] ABSTRACT

Water cut-off means wherein a valve operating arm extends from a valve and is movable to open or close the valve, a counterbalance valve operating member is provided with a tray on one end and is so arranged that when water enters the tray the valve operating member moves in such a way as to actuate the valve operating arm and close the valve.

6 Claims, 3 Drawing Figures

WATER CUT-OFF MEANS

This invention relates to means for automatic cut-off of water supply to a garden sprinkler or other distributing device wherein the water is sprayed into the air.

BACKGROUND OF THE INVENTION

For many applications, including market gardens, home gardens, nurseries and the like, it is desirable to determine accurately the amount of watering which takes place for a given sprinkler setting, but frequently it is inconvenient to accurately time the period of watering a given area and ensure that the watering is terminated at that time.

The need for an automatic cut-off device has been recognised and a number of attempts have been made to devise a satisfactory cut-off device. Satisfactory devices have been made which function well, including for example water motors which drive a shut-off valve through a set of gears, but these are expensive and the shutting off process is usually associated with slow closure of a valve member which results in a diminishing of watering towards the sprinkler itself. Thus, uneven watering can take place.

BRIEF SUMMARY OF THE INVENTION

Briefly the invention may be described as comprising a base having a valve secured to it, the valve having a valve operating arm extending outwardly from it, the base also carrying a valve operating member which is movable and which has a tray on one end, and is also provided with counterbalance means, the arrangement being such that when a quantity of water enters the tray the valve operating member moves and in turn engages the valve operating arm so as to close the valve.

More specifically this invention consists of water cut-off means comprising a base, a valve secured to the base, a valve operating arm extending from the valve and movable to open or close the valve, a valve operating member movable relative to the base, a tray on one end of the valve operating members and counterbalance means on the valve operating member, so constructed and arranged that upon a quantity of water entering the tray, the valve operating member moves and in turn moves the valve operating arm so as to close the valve.

The lever arm, in one form of the invention, is arranged to be dislodged upon filling of the tray with water, and drops onto means coupled to the valve arm, while in another form the lever arm is arranged with an "over centre" spring to snap downwardly upon filling of the tray with water, in turn driving the valve arm downwardly.

BRIEF DESCRIPTION OF THE DRAWINGS

Two embodiments of the invention are described hereunder in some detail with reference to and are illustrated in the accompanying drawings, in which.

Figure 1:
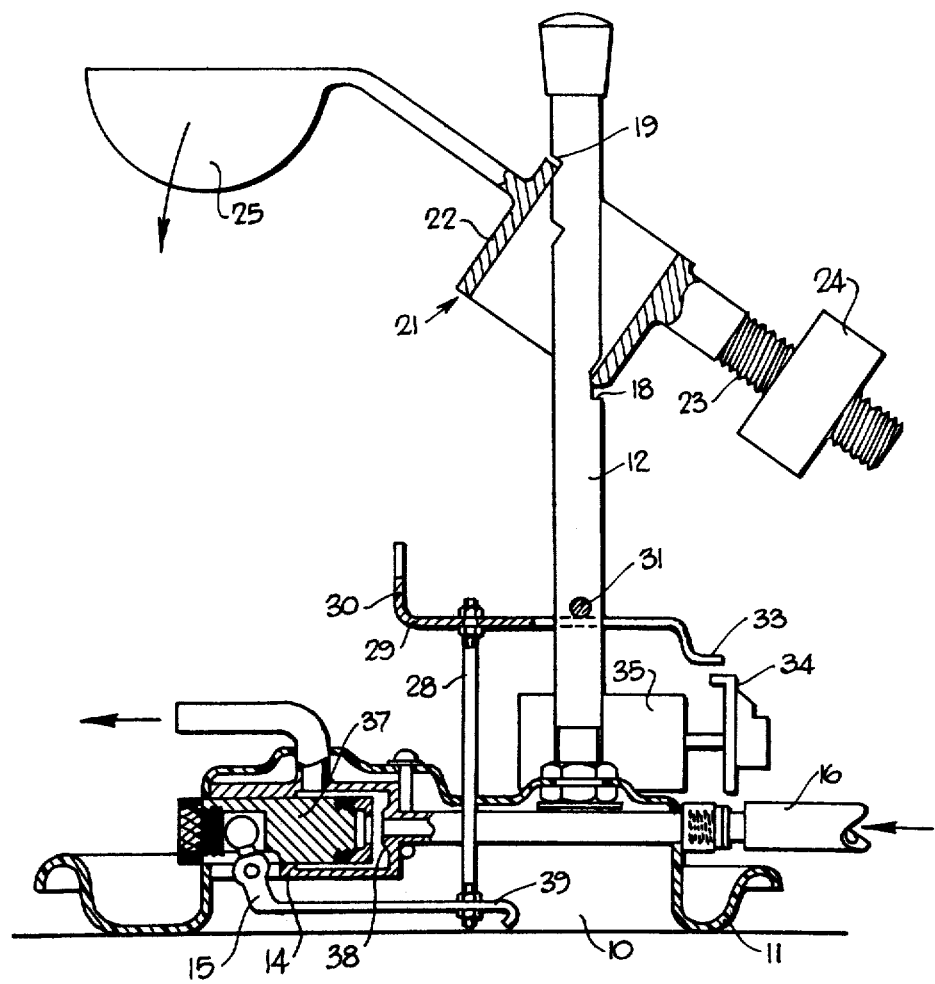
FIG. 1 is an elevational section through water cut-off means according to a first embodiment.

In the first embodiment of FIG. 1 a device for cutting off water supply comprises a base 10 having a surrounding trough 11 and a post 12 upstanding therefrom. In use the trough 11 fills with water and imparts effective weight to the base. The base 10 supports a valve 14 having a valve operating arm 15 projecting outwardly, and is arranged to be connected to a supply hose 16 (or to a pipe) which is in and forms part of a water supply line to a sprinkler (not shown). A sprinkler is at an end of the supply hose or pipe, and a short distance away from the device, the device lying within the range of the sprinkler but near the periphery of that range.

The base 10 has its upstanding post 12 positioned substantially centrally, and the upstanding post 12 is provided with two notches, one on one side designated 18 and constituting a lower notch and the other on the other side designated 19 and situated above the lower notch and constituting an upper notch. The side walls of each notch slope relative to the vertical axis of the post 12.

A valve operating member 21 comprises a cylindrical sleeve 22 of considerably greater diameter than the post 12 and positioned around the post, the length of the sleeve being such that when the lower edge on one side engages in the lower notch 18 the upper edge on the other side engages in the upper notch 19, as shown in FIG. 1. The sleeve 22 has a threaded lever arm 23 projecting from one side, the thread carrying on it a threaded counterweight 24 which can be screwed in towards the sleeve or outwardly from the sleeve, while on substantially the same axis the lever arm extends in the other direction from the other side of the sleeve and terminates in a small tray 25, the small tray being horizontal when the sleeve engages in the notches.

The lever arm 15 carries a pair of upstanding connecting rods 28 thereon, which in turn support a bifurcate or 'U' shaped striker plate 29, and end 30 of which is upstanding. A cross-pin 31 is used to lock the unit with the valve in a closed position.

The other end of the striker plate 29 has on it a depending flange 33 arranged to be engaged by the cam member 34 of a clockwork type timer 35, but the flange 33 is flexible (for example, formed of that resin based plastics material known as ABS), and can be deflected for resetting of the timer. The timer cam member 34 is effective, however, in engaging the flange 33 (upon expiry of a set time on the timer 35), and lifting the striker plate until it engages the cross-pin 31, this lifting the valve operating arm 15 and opening the valve 14 by moving its plunger 37 away from the valve seat 38, as shown in FIG. 1. The valve 14 will be seen to be of the type known as a "cistern valve". The timer 35 however, does not have sufficient torque to lift the striker plate if it is supporting the member 21, so that inadvertent initiating of a watering cycle is avoided.

An end of the valve operating arm 39 extends downwardly to engage the turf (or the ground, as the case may be) when valve 14 is closed.

In use, the counterweight 24 is adjusted relative to the sleeve 22 to determine the amount of water for which the sprinkler is to be set, the lever arm 23 being calibrated for this purpose. (This is not illustrated.) The sleeve 22 is lifted up to be engaged by the lower and upper notches of the post, and the valve operating arm of the valve is lifted, either by moving the base over the ground in such a way that the end 39 rides up, or by the cam member 34 of timer 35 (after a period of time fixed by the timer setting). The sprinkler operates for sufficient time to provide the extent of watering which is determined by the counterweight setting, and when this time has elapsed the tray 25 will have sufficient water in it that it will tilt the sleeve 22. Since the sleeve is larger in diameter than the post, and since the side wall of the lower notch 18 slopes, the sleeve will pivot about its point of contact with the notch edges and the lower edge of the sleeve will thereby be dislodged from the notch. When this happens the sleeve falls, functioning as a valve operating member, striking the striker plate on the valve operating arm and closing the valve as it drops, the downward movement being guided by the post, and the valve being held closed by the weight of the components. For re-setting it is merely necessary to tilt the frame, drain the contents of the tray and again lift the sleeve to again engage the notches.

Figure 2:
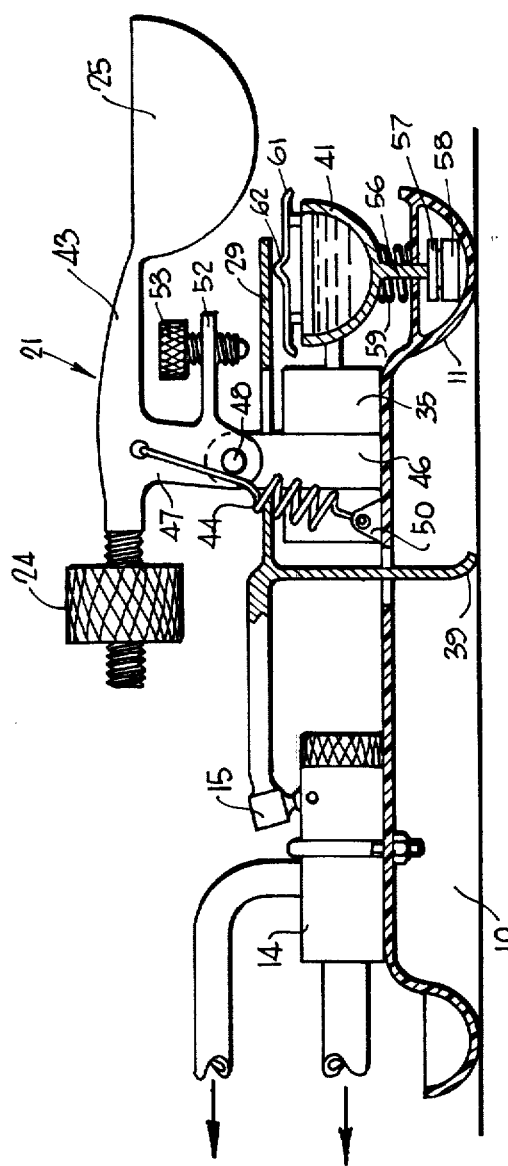
FIG. 2 is a similar section according to a second embodiment.
Figure 3:
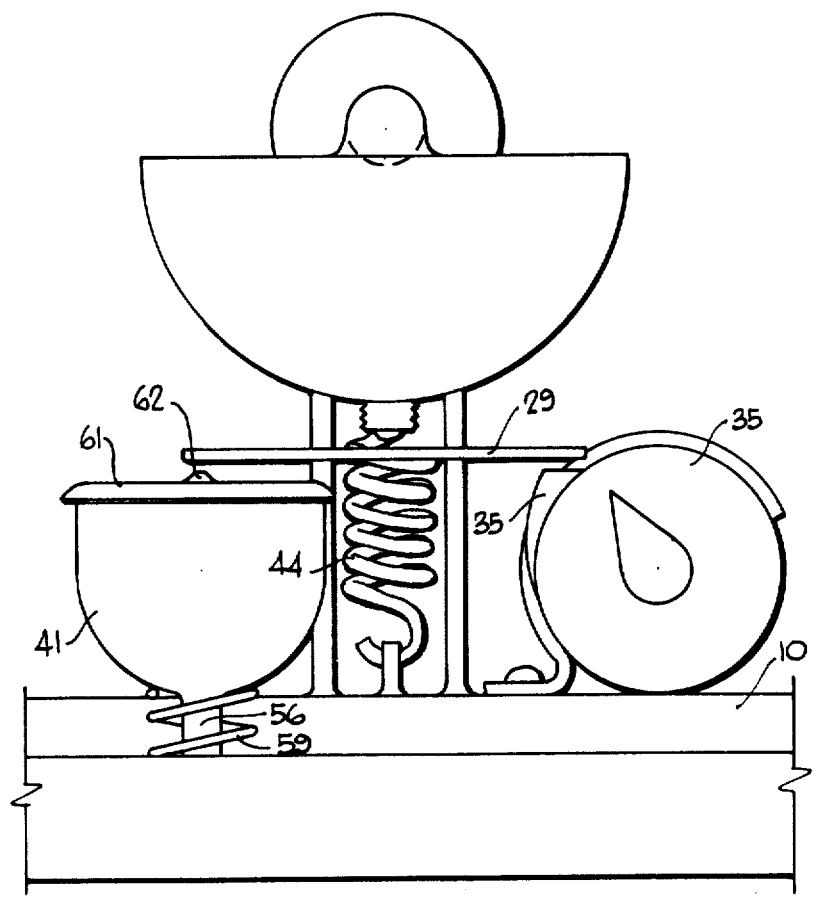
FIG. 3 is a fragmentary end elevation of FIG. 2.

The second embodiment of FIGS. 2 and 3 still employs one of the characterising features of the invention, namely a tray being carried on the end of a lever arm which in turn moves a valve operating arm for closing a valve after a watering sequence has been completed. It may be noted that this arrangement allows the lever arm and tray assembly to be reset separately from the valve operating arm, and thereby enables means to be employed for re-setting the valve without the operator being wetted by the sprinkler water.

The first embodiment of FIG. 1 employed either the engagement of the depending end 39 of the valve operating arm 15 with the ground, or the timer cam member 34, to open the valve 14. The second embodiment of FIGS. 2 and 3 employs a still further alternative means, namely an evaporating bowl designated 41, and described hereunder in further detail.

The first embodiment took advantage of impact as the valve operating member 21 descended the post 12 to strike the striker plate 29 to in turn move the valve operating arm 15. The second embodiment of FIGS. 2 and 3 employs a lever arm designated 43 and described hereunder in further detail, and operates through an over centre spring 44.

Referring to the second embodiment in detail, the cut-off means comprises a base 10 surrounded again by the trough 11 as in the first embodiment so that the base becomes stabilised when the trough 11 fills with water. The valve 14 is secured to the upper face of the base 10, up side down and reversed from the position shown in FIG. 1, and the valve operating arm 15 extends over the base 10 to terminate in the striker plate 29. The valve operating arm 15 also has a depending end 39 which functions in the same manner as in the first embodiment.

The base 10 is provided with upstanding brackets 46 and a depending arm 47 of the lever arm 43 is pivoted between the upstanding brackets 46 on pivot pins 48.

The over centre spring 44 is secured at its lower end to a lug 50 on the base 10 and at its upper end to the lever arm 43 of the valve operating member 21 at a point above the pivot pins 48, in one position the centre line of the over centre spring 44 being to the left of the pivot pins 48 and in another position to the right. A lug 52 extends outwardly from the depending arm 47 and carries in it an adjusting screw 53. The lever arm 43 is provided with a threaded counterweight 24 and a tray 25 as in the first embodiment, and as the tray fills with water and the tray lowers the over centre spring 44 stretches, passes the centre line of the pivot pins 48 and snaps downwardly so that the adjusting screw 53 strikes the striker plate 29 on the lever arm 15 to thereby close the valve 14. Again it will be noted that the valve operating member 21 may be reset without operating the valve operating arm 15.

As in the first embodiment, the base 10 supports a timer 35, the cam member 34 of which engages the underface of the striker plate 29 to open the valve after a period of time has elapsed which is determined by the setting of the timer. However, circumstances sometimes arise under which it is desirable to operate a sprinkler for at least one sequence, for example during the absence of an operator, and such circumstances are usually associated with conditions of high evaporation. The evaporating bowl 41 is arranged to be filled or partly filled with water, and has a depending stem 56 terminating in a galvanised iron disc 56 which engages a magnet 58 when the bolw is in its down position. A compression spring 59 is compressed when in this position and the bowl is retained away from the underface of the striker plate 29. The bowl however is provided with a cover 61 having a central projection 62 and the arrangement is such that upon evaporation of water from the bowl 41 the upward thrust of the spring 59 exceeds the magnetic attraction afforded by the magnet 58 and the bowl moves upwardly at a rapid speed to lift the striker plate 29 and thus open the valve 14. However, the weight of water in the tray 25 is such that, after the sequence has been completed, the valve 14 is closed and the bowl 41 is again depressed.

Note:

The timer employed in both the embodiments described above was a HOLZER model P73 and bearing the other designation ZU60AR-244. This timer was produced in Germany and was purchased from Australian Controls Manufacturing Pty. Ltd. of 511 Keilor Road, Niddrie in the State of Victoria. This timer is of the type provided with a 15° deflection.

What I claim is:

1. Water cut-off means comprising a base having an upstanding post, a valve secured to the base, a valve operating arm extending from the valve and movable to open or close the valve, a lever arm pivotally movable with respect to the base having a tray on one end of the lever arm and a counterweight threadably engaging the other end of the lever arm, a pair of diametrically opposite notches in side wall of the post spaced axially from each other, said lever arm having a sleeve intermediate its ends, the sleeve being of greater diameter than the post and arranged to be supported with diagonally opposite edges of the sleeve engaged in respective notches when the sleeve is inclined relative to the post, but to be pivoted out of said notches upon a quantity of water entering the tray and thereupon to descend down the post and move the valve operating arm so as to close the valve.

2. Water cut-off means comprising a base, a valve secured to the base, a valve operating arm extending from the valve and movable to open or close the valve, a valve operating member movable relative to the base, said valve operating member comprising a lever arm having a tray at one end and a counterweight threadably engaging the other end, a post upstanding from the base, a pair of diametrically opposite notches in side walls of the post spaced axially from each other, said lever arm having a sleeve intermediate its ends, the sleeve being of greater diameter than the post and arranged to be supported with diagonally opposite edges of the sleeve engaged in respective notches when the sleeve is inclined relative to the post, but to be pivoted out of said notches upon said quantity of water entering the tray and thereupon to descend down the post and move the valve operating arm so as to close the valve, a striker plate adjacent the post and arranged to receive impact of the valve operating member, and connecting means joining the valve operating arm and the striker plate.

3. Water cut-off means according to claim 2 further comprising a timer carried by the base, and a timer cam member on the timer operable to lift the striker plate and open the valve upon expiry of a time period.

4. Water cut-off means according to claim 2 wherein the striker plate has a depending flange of flexible material which is releasably engageable by said cam member.

5. Water cut-off means according to claim 2 further comprising an evaporating bowl operatively engageable against the striker plate to open the valve upon evaporation of the water within the bowl.

6. Water cut-off means according to claim 2 wherein the valve operating arm has a depending end arranged to contact the turf or ground supporting the base when the valve is closed but to ride up over the turf or ground and thereby open the valve when the base is moved over the turf or ground.

* * * * *